United States Patent [19]

Parsons et al.

[11] 4,114,129
[45] Sep. 12, 1978

[54] THERMALLY RESPONSIVE ACTUATOR

[75] Inventors: Bruce B. Parsons, Tokyo, Japan; Denis G. Wolfe, Santa Ana, Calif.

[73] Assignee: Robertshaw Controls Company, Richmond, Va.

[21] Appl. No.: 758,036

[22] Filed: Jan. 10, 1977

[51] Int. Cl.² .................................... H01H 37/48
[52] U.S. Cl. .................................. 337/387; 337/383; 337/394
[58] Field of Search ............ 337/394, 386, 393, 382, 337/383, 384, 123, 125, 387, 399, 352; 236/68 D, 102

[56] References Cited
U.S. PATENT DOCUMENTS

| 2,705,747 | 4/1955 | Strange | 337/394 |
| 3,213,244 | 10/1965 | McCarrick | 337/386 |
| 4,008,454 | 2/1977 | Bowling | 236/102 |

*Primary Examiner*—Harold Broome
*Attorney, Agent, or Firm*—Fulwider, Patton, Rieber, Lee & Utecht

[57] ABSTRACT

There is disclosed a thermally responsive actuator useful for solenoids of electromagnetic valves and the like that includes a thermally responsive assembly of first and second metallic members that function as a thermocouple to generate an electrical voltage and also as a bimetallic operator for a switch carried within a housing of the device and operative to make and break the thermocouple circuit.

12 Claims, 7 Drawing Figures

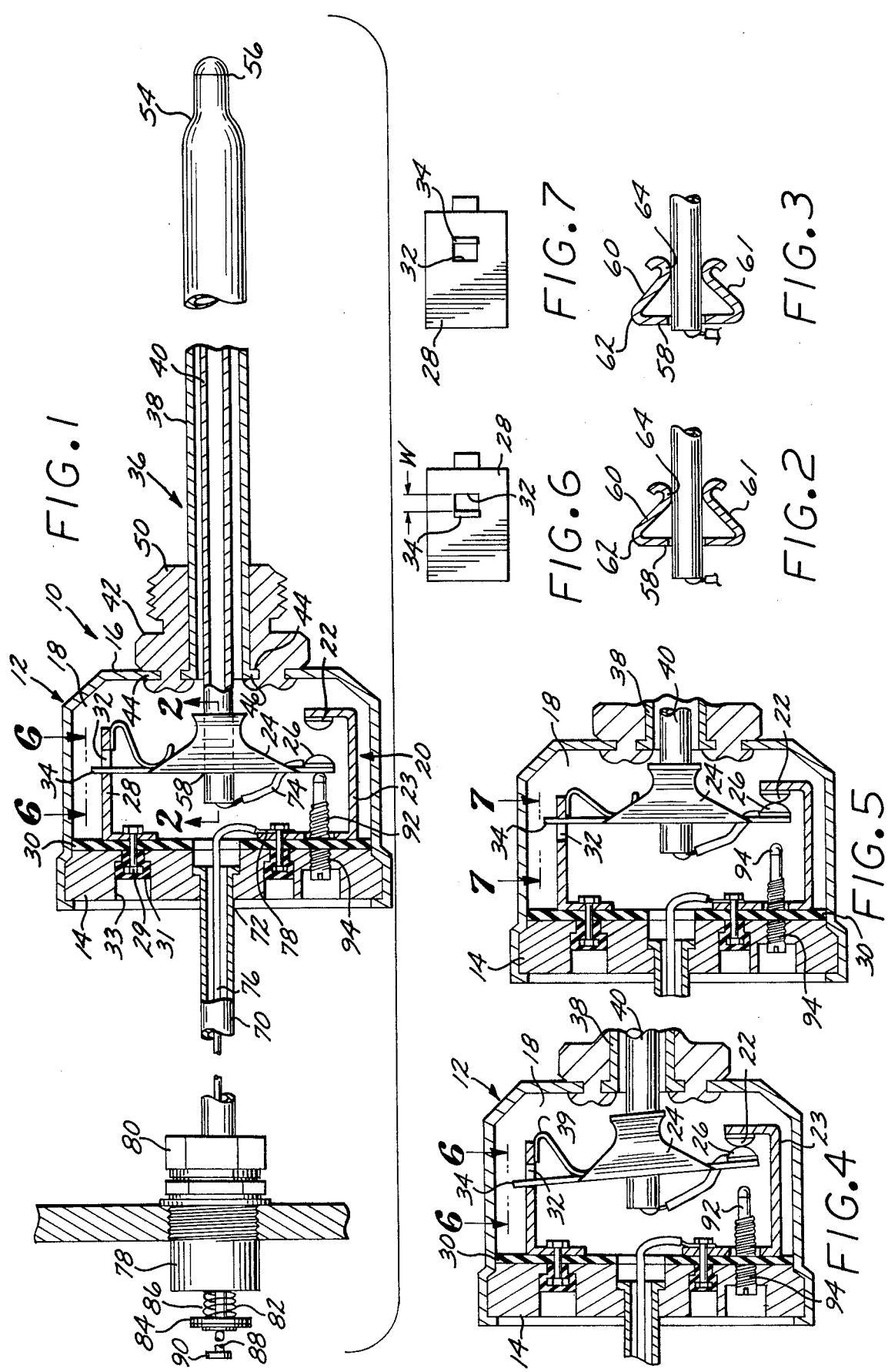

THERMALLY RESPONSIVE ACTUATOR

BACKGROUND OF THE INVENTION

Temperature responsive switches have been employed as flame sensing elements in appliances such as gas burners and the like. Typically, these devices have employed a bimetallic assembly of two metallic members having dissimilar coefficients of thermal expansion. The members are interconnected at one end and, at their opposite ends, are coupled to a housing and a switch mechanism within the housing whereby the differential thermal expansion of the assembly moves the blade of the switch mechanism. The switch is in an electrical circuit supplying power from a supplemental source to the solenoid of a valve and the like in the gas line to the burner.

Another type of actuator for a solenoid valve used a thermocouple in which two members of dissimilar metals exhibiting a thermoelectric effect are joined at a hot junction which is positioned adjacent the burner flame. The members' cold junctions are located at a point removed from the flame. This actuator is effective to generate a sufficient electrical voltage that can be applied to typical solenoid valves without the use of supplemental electrical sources.

A difficulty with the thermocouple actuator is that it is not rapidly responsive to extinguishment of the burner flame, often requiring one to several minutes for adequate cooling to reduce its potential sufficiently for movement of the valve closure member. A major disadvantage of the thermally responsive switch mechanism is, of course, its dependency on a supplemental electrical source.

BRIEF STATEMENT OF THE INVENTION

This invention comprises an actuator device which includes a thermocouple and a thermally responsive switch in the thermocouple circuit with a rapid response to thermal changes. The thermocouple metallic elements also function as the bimetallic operator for the switch.

Briefly, the device comprises a housing with switch means received therein that includes a stationary contact and a switch blade movably mounted within the housing and carrying a second contact into and out of registration with the stationary contact.

The thermally responsive elements comprise a pair of coextensive metal members of dissimilar metals, one of which is secured to the housing and attached at its opposite end to the other member. The free end of the other member is movably received within the housing and is coupled mechanically to the switch blade.

The coextensive metal members are selected of dissimilar metals to exhibit a desirably high thermoelectric effect, thereby functioning as a thermocouple. The metals are also chosen with appreciably different coefficients of thermal expansion whereby a differential thermal expansion of the members occurs which is adequate to provide sufficient movement to operate the switch blade into and out of registration with the stationary contact of the switch. The members are electrically coupled through the housing and switch contacts to first and second electrical conductors, the housing thereby serving as the cold junctions for the thermocouple members.

BRIEF DESCRIPTION OF THE DRAWINGS

The invention will be described with reference to the illustrations of which:

FIG. 1 is a sectional view of the thermally responsive actuator;

FIG. 2 and 3 illustrated a slip clutch mechanism employed to couple between the thermally responsive switch operator and the switch blade.

FIGS. 4 and 5 illustrate operation of the switch mechanism; and

FIGS. 6 and 7 illustrate the lost motion elements of the switch mechanism.

DESCRIPTION OF THE PREFERRED EMBODIMENTS

Referring now to FIG. 1, the thermally responsive actuator 10 is illustrated in sectional view. The actuator 10 includes a housing 12 defined by a base plate 14 and a surmounted cup member 16 defining an interior chamber 18. Switch means, generally indicated at 20, are received within chamber 18 and include a stationary electrical contact 22 and a switch blade 24 movably mounted within chamber 18 and carrying electrical contact 26 into and out of registration with fixed contact 22. The switch blade 24 is mounted within chamber 18 by fixed bracket 28 that is secured to base plate 14 but out of electrical contact therewith by insulating spacer plate 30. The assembly of base plate 14, insulator spacer plate 30 and bracket 28 is secured by fasteners such as rivets or bolt fasteners 29 which are received within insulating gromets 31 and are seated within counterbored apertures 33 of base plate 14. A similar assembly is provided for securing the fixed position contact 22 and it associated bracket 23.

Bracket 28 has a slot 32 which receives a lateral extremity 34 of switch blade 24, thereby providing a lost motion, articulated mounting for the switch blade 24. A leaf spring 39 is secured to bracket 28 and is biased against switch blade 24. The details of this mounting of the switch blade and its operation will be described in greater detail hereinafter.

The actuator also includes a thermally responsive assembly generally indicated at 36. This assembly includes first and second coexstensive members 38 and 40, respectively, which are formed of dissimilar metals exhibiting a thermoelectric effect and having different coefficients of thermal expansion. In the preferred embodiment, the first and second members are concentric metal tubes. The outer tube 38 is secured to the housing 12 by a mounting sleeve 42 having a peripheral groove 44 on its inside wall to receive an outwardly flared lip 46 of tube 38. The outside wall of sleeve 42 is riveted about a central aperture in the wall of cup member 16 through which the assembly extends. The outboard end 50 of sleeve 42 bears external threads 52 whereby the actuator device can be mounted on a bracket and the like to support the thermally responsive elements in a burner flame. The assembly of outer tube 38 and inner tube 40 is interconnected at its opposite end, the outer tube having a swedged portion 54 and terminating in a welded joint 56.

The inner tube is freely received within chamber 18 and is mechanically linked to the switch blade 24 by coupling means which includes a slip clutch mechanism. The switch blade has a central aperture 58 which receives the inboard end of the inner tube 40 and has opposite prongs such as 60 which are axially folded along inner tube 40 to provide a resilient and sliding attachment to this rod.

Referring now to FIGS. 2 and 3, the details of the clutch are illustrated. The inner tube 40 projects through central aperture 58 which, as shown is of a substantially larger diameter than the rod to provide a clearance space therebetween. The prongs 60 and 61 are provided with an acute angle bend 62 and a reverse bend 64 to provide a resilient grasping of rod 40 which permits the rod to slip, axially, in the assembly. FIGS. 2 and 3 illustrate the assembly with rod 40 at different axial positions within the clutch assembly.

Referring again to FIG. 1, the connector sleeve 42 provides electrical continuity between outer tube 38 and cup member 16 of housing 12. This electrical continuity is continuous through the metallic base plate 14 of the housing to the tubular member 70 which is mounted in aperture 72 of base plate 14. Electrical continuity is also established from inner tube 40 to the contact 26 carried on switch blade 24 by conductor 74. The fixed position contact 22 is electrically connected to electrical conducting lead 76 at terminal 78.

THe metallic tubular member 70 and lead 76 serve as first and second conductors which extend from the thermally responsive actuator assembly to a conventional connection to a solenoid assembly within housing 78. The housing 78 contains a solenoid coil which has one of its terminals connected through the housing 78, nut 80, tube 70, plate 14, and cup member 16 to the outer tube 38. The opposite terminal of the solenoid coil is connected with a standard button connector to conductor 76. The solenoid coil housing 78 supports a reciprocal plunger having a shaft 82 extending outwardly therefrom and bearing a valve closure plate and washer 84. A coil spring 86 is provided to bias the closure member against the valve seat of the valve structure. The valve body (not shown) also supports a push rod 88 that extends exteriorly of the valve body to a button 90 whereby the closure member 84 can be manually lifted off the valve seat.

Referring now to FIGS. 4 and 5, the operation of the switch mechanism will be described. As illustrated in FIG. 2, the differential thermal expansion of the concentric tubes 38 and 40 caused by their exposure to a burner flame is sufficient to moved the switch blade 24 and its associated contact 26 into electrical registration with fixed position contact 22. Leaf spring 39 retains the blade extremity 34 against the opposite side of slot 32. The continued differential movement of the tubular members 38 and 40, caused by their rising temperature with exposure to the flame of a burner, will continue to retract inner tube 40 from chamber 18 of housing 12. This continued motion will pivot switch blade 24 about the point of engagement of contacts 22 and 26, causing the opposite lateral extremity 34 of the switch blade to move to its opposite position in slot 32 against the biase of spring 39.

FIGS. 6 and 7 illustrate the different respective positions of the lateral extremity 34 within slot 32. FIG. 6 corresponds to the position of extremity 34 in slot 32 as illustrated in FIG. 4 while FIG. 7 refers to this position as shown in FIG. 5.

The degree of travel of the movable contact 26 between the positions shown in FIGS. 1 and 4 is, desirably, fixedly adjustable. This adjustment capability is provided by a adjustable stop in the form of a pin 92 having an externally threaded shank 94 which is received within a threaded aperture in insulating spacer plate 30.

The operation of the thermally responsive actuator will now be described. The actuator is illustrated in FIG. 1 at its cold position, with switch contacts 26 and 22 separated. When the thermally responsive assembly of tubes 38 and 40 is exposed to an elevated temperature such as the pilot burner of an appliance and the like, an electrical potential is generated between the cold junction ends of these tubular members. The inner tubular member 40 is retracted from housing 12 by the differential thermal expansion of these tubular members. The withdrawal of the tube initially moves the switch blade into the position shown in FIG. 4 where it closes the circuit through fixed position contact 22. Continued heating of the assembly of thermally responsive tubes thereafter causes the switch blade 24 to pivot about contacts 22 and 26 against the bias of spring 39, and the switch blade responds by moving to the position shown in FIGS. 5 and 7. Thereafter, continued heating of the assembly will result in the tubular member 40 slipping in the clutch connection to the switch blade, changing its relative position therein from that illustrated in FIG. 2 to that shown in FIG. 3.

Upon extinguishment of the burner flame heating the assembly of tubes 38 and 40, these tubes cool and inner tube 40 is advanced into the chamber 18, responding to the differential contraction of the tubes. Spring 39 initially urges the lateral extremity 34 of the switch blade from its advanced to its retracted position in slot 32, changing its position between that shown in FIG. 7 to that of FIG. 6.

The width W of slot 32 is preselected to provide a desirable time interval for this action which can be from 1 to about 10, preferably from 2 to about 4 seconds. This degree of motion is desirable to provide a tolerance in the switch mechanism and avoid bouncing or fluttering of the switch contacts 22 and 26 with minor temperature changes.

The continued cooling of the thermally responsive assembly thereafter separates switch contacts 22 and 26, the switch blade 24 changing from the position shown in FIG. 4 to that shown in FIG. 1. Thereafter, any further cooling of the thermally responsive assembly results in the movement of the inner tube 40 from a position such as that shown in FIG. 3 to the position shown in FIG. 2, the latter position corresponding to approximately ambient temperature of the thermally responsive assembly.

Various metals can be selected for the inner and outer tubes 40 and 38. Desirably, these tubes are formed of metals having a high mechanically strength at elevated temperatures, e.g., temperatures in the range of 1000°–1500° F. as are commonly encountered by exposure to flames. Additionally, the metals should have a sufficient corrosion resistance and should be inert to the fuel and combustion process. Any metals which are not sufficiently corrosion resistent or which are not inert, can be rendered suitable for use by an appropriate surface treatment of coating in accordance with standard procedures in the art. Desirably, the metals chosen have a low electrical resistivity with a high thermoelectric effect. These two properties are interrelated since the electrical voltage developed at the cold junctions of the assembly is inversely related to the former, and directly related to the latter, property. Finally, the selected metals should have sufficient differences in their coefficients of thermal expansion so that the assembly will exhibit an adequate differential thermal expansion to operate the switch mechanism. The slip clutch coupling between the inner tube 40 and the switch blade 34 greatly facilitates the design and selection of the metals since the slip action will accomodate any thermal expansion in excess of that required to actuate the switch. Desirably, a differential expansion greater than the minimal necessary to operate the switch is provided, thereby insuring that the switch mechanism will have reproducible time intervals on opening and closing.

It has been found that a very suitable thermally responsive assembly can be provided by forming the outer tube 38 of Copel, an alloy of copper and nickel and the inner tube 40 of stainless steel.

The invention has been described with reference to the presently preferred embodiment thereof. It is not intended that the invention be unduly limited by this description of the preferred embodiment. Instead, it is intended that the invention be defined by the means, and their obvious equivalents, set forth in the following claims. What is claimed is:

1. A thermally responsive actuator comprising:
    a housing;
    switch means received within said housing including stationary contact means and a switch blade movable within said housing and carrying movable contact means into and out of engagement with said stationary contact means;
    temperature responsive means including first and second coextensive members of dissimilar metals exhibiting a thermoelectric effect and having different coefficients of thermal expansion, one of said members fixedly secured to said housing and distally secured to other of said members, the latter being movably received within said housing;
    coupling means within said housing linking the received end of said other member in mechanical coupling to said switch blade and in electrical coupling to said movable contact means; and
    first and second output conductor means extending, respectively, to electrical contact with said fixed contact and with said first member.

2. The thermally responsive actuator of claim 1 wherein said first and second members are distally secured by a welded joint.

3. The thermally responsive actuator of claim 1 wherein said first of said coextensive members and said second conductor are in electrical continuity with said housing.

4. The thermally responsive actuator of claim 3 wherein said first and second conductors comprise concentric outer and inner conductors in respective electrical continuity with said housing and with said stationary switch contact means.

5. The thermally responsive actuator of claim 1 wherein said coupling means comprises clutch means slidably carried on said other member and dependent from said switch blade means.

6. The thermally responsive actuator of claim 1 including bracket means within said housing and bearing slot means receiving a lateral extremity of said switch blade and forming a pivot point therefor.

7. The thermally responsive actuator of claim 1 wherein said switch blade means extends laterally to opposite sides of said other member with said movable contact carried at one lateral extremity and bracket means carried internally of said housing and having slot means receiving the opposite lateral extremity of said switch blade means 8. The thermally responsive actuator of claim 1 wherein the first of said coextensive members is a tubular member receiving a concentric inner member.

9. The thermally responsive actuator of claim 5 wherein said clutch means comprises a central aperture in said switch blade means having a larger diameter than, and receiving, the free end of said other member with folded lateral prong extensions resiliently biased against said other member, engaging said other member in sliding, frictional contact.

10. A thermally responsive electric voltage generator and switch mechanism comprising:
    a housing having a base plate and a surmounted cup member;
    switch means mounted within said housing by insulator means isolating said switch means from electrical contact with said housing and including stationary contact means and a switch blade movable within said housing and carrying movable contact means into and out of engagement with said stationary contact means;
    temperature responsive means to generate a source of electrical voltage and to actuate said switch means including an outer tubular member carried, at one end, by said cup member of said housing and coaxially receiving a second tubular member of a dissimilar metal, coextensive therewith and distally secured and in electrical contact therewith, said outer and inner tubular members formed of dissimilar metals exhibiting a thermoelectric effect and having different coefficients of thermal expansions and with said inner tubular member projecting into and removably within said housing;
    coupling means within said housing linking the received end of said inner member to said switch blade and including clutch means slidably carried on said inner member supporting said switch blade means;
    electrical conductor means connecting the received end of said inner member to said movable contact means; and
    first and second output conductor means extending respectively, to electrical contact with said fixed contact and with said cup member of said housing.

11. The mechanism of claim 10 wherein said switch blade has a central aperture to receive said end of said inner member and wherein said clutch means comprises lateral prongs dependent on said switch blade means and having reverse bends to provide a resilient grasping of the received end of said inner member.

12. The mechanism of claim 11 including bracket means carried on said base plate internally of said housing by insulator means isolating it from electrical contact therewith and bearing slot means to receive an end of said switch blade means to form a pivot point therefor.

* * * * *